United States Patent
Wei

(10) Patent No.: US 6,834,820 B2
(45) Date of Patent: Dec. 28, 2004

(54) WIRE WINDING DEVICE HAVING COAXIAL AND MULTIPLE WHEELS

(76) Inventor: Jose Wei, No. 17-2, Pai Ling $1^{st}$ Rd., Hsin Tien City, Taipei Hsien (TW)

( * ) Notice: Subject to any disclaimer, the term of this patent is extended or adjusted under 35 U.S.C. 154(b) by 0 days.

(21) Appl. No.: 10/421,772

(22) Filed: Apr. 24, 2003

(65) Prior Publication Data

US 2004/0159735 A1 Aug. 19, 2004

(30) Foreign Application Priority Data

Feb. 18, 2003 (TW) ........................... 92202527 U

(51) Int. Cl.$^7$ .............................................. B65H 75/28
(52) U.S. Cl. ................. 242/378; 242/378.1; 242/378.2; 242/378.3; 191/12.2 R
(58) Field of Search .............................. 242/378, 378.1, 242/378.2, 378.3; 191/12.2 R

(56) References Cited

U.S. PATENT DOCUMENTS

| | | | | |
|---|---|---|---|---|
| 3,854,017 A | * | 12/1974 | Crim | 191/12.2 R |
| 4,053,118 A | * | 10/1977 | Aikins | 242/378.2 |
| 4,271,893 A | * | 6/1981 | McCluskey | 160/178.1 R |
| 5,022,600 A | * | 6/1991 | Blanc et al. | 242/378.2 |
| 6,019,304 A | * | 2/2000 | Skowronski et al. | 242/373 |
| 6,371,398 B1 | * | 4/2002 | Liao | 242/378.1 |
| 6,434,249 B1 | * | 8/2002 | Wei | 381/370 |
| 6,616,080 B1 | * | 9/2003 | Edwards et al. | 242/378.1 |
| 6,644,582 B1 | * | 11/2003 | Liao | 242/378.1 |

* cited by examiner

Primary Examiner—Kathy Matecki
Assistant Examiner—Sang Kim
(74) Attorney, Agent, or Firm—Dennison, Schultz, Dougherty & MacDonald

(57) ABSTRACT

A wire winding device having coaxial and multiple wheels include characteristics of: a main wheel formed with at least three A, B and C turning wheels having a same center orifice flexibly connected to an axis, A, B and C storage grooves formed on the wheel surfaces of the A, B and C turning wheels at least two wires S winded and stored in the A, B and C storage grooves, and upper, middle and lower wires stored in different storage grooves, so a to store at least two wires in the device. At least two wires are efficiently stored in the device when winding the wires, and at least two wires are extended with appropriate predetermined lengths instead of releasing wires at excessive lengths when releasing the wires.

3 Claims, 9 Drawing Sheets

WIRE WINDING DEVICE HAVING COAXIAL AND MULTIPLE WHEELS

BACKGROUND OF THE INVENTION (a) Field of the Invention

The invention relates to a wire winding device having coaxial and multiple wheels, and more particularly, to a wire winding device capable of effectively collecting and extending at least two wires.

(b) Description of the Prior Art

According to the U.S. Pat. No. 6,434,249B1 "The Earphone Wire Winding Box with Coaxial and Dual Wheels" by the inventor, the structure disclosed is quite indeed practical. However, this structure is merely capable of winding and releasing with respect to a single signal wire but not two or more wires. Therefore, suppose the number of earphone signal wires is designed as two for serving the right and left ears of a user, the wire for the left ear extended is comparatively longer than that for the right ear, and thus the wire having the longer length fails to be entirely stored in the wire winding box during wire winding due to different lengths of the two wires, and part of the wire having the longer length is resultingly exposed. This dilemma is even worsened when the wire having the longer length is extended and inevitably scattered about the body of the user. Therefore, it is a vital task of the invention as how to effectively winding and releasing two extended wires having different lengths.

SUMMARY OF THE INVENTION

Therefore, the primary object of the invention is to provide a wire winding device having coaxial and multiple wheels for storing at least two wires, wherein at least two wires are efficiently stored during wire winding and at least two wires are extended at appropriate and predetermined lengths during wire releasing without releasing wires at excessive lengths.

The other object of the invention is to provide a wire winding device having coaxial and multiple wheels for storing and releasing extension wires of earphones and electric appliances.

To accomplish the aforesaid objects, the characteristics and functions of the invention shall be described with the accompanying drawings below.

DETAILED DESCRIPTION OF THE PREFERRED EMBODIMENTS

Figure 1:
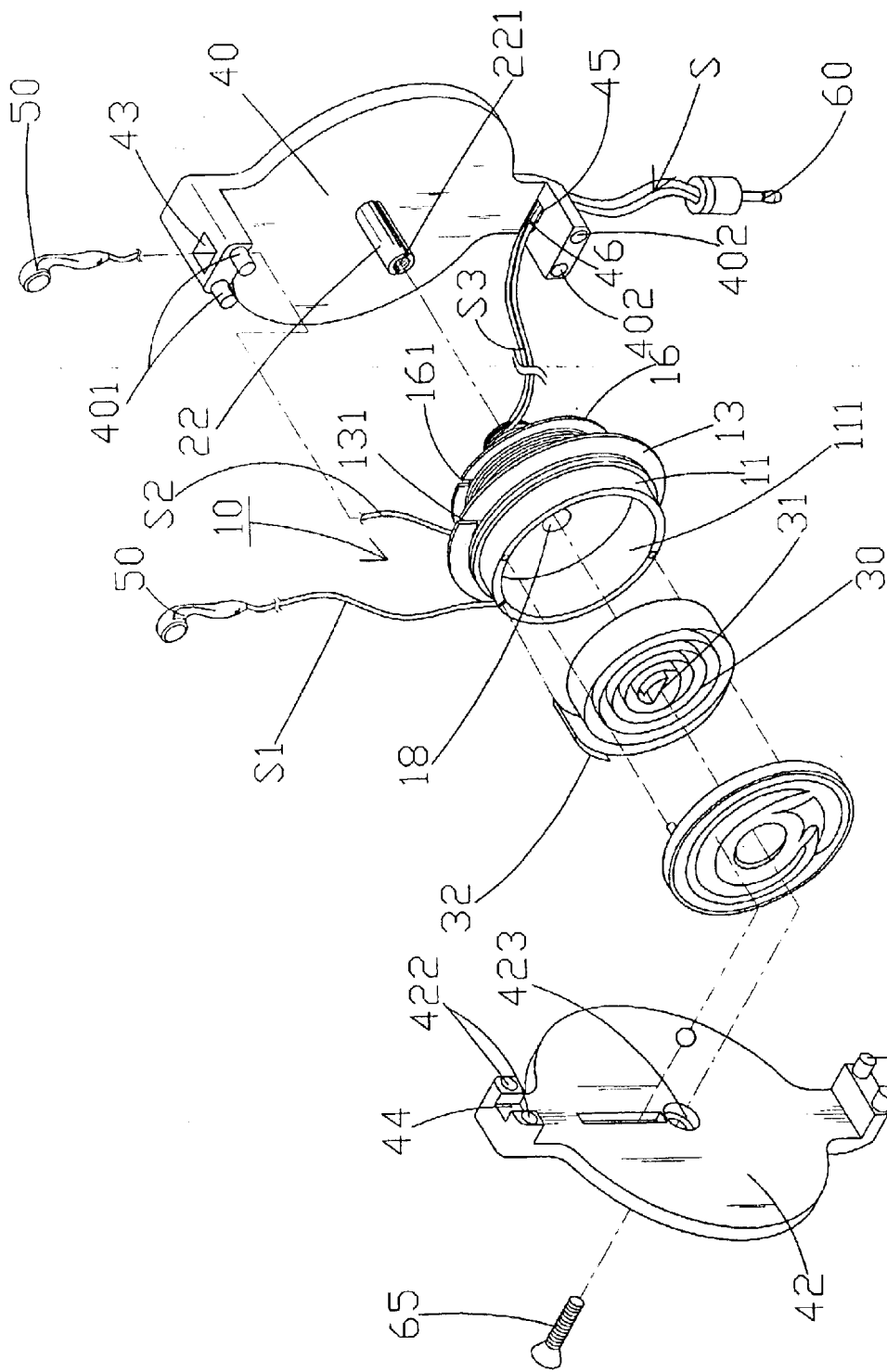
FIG. 1 shows an exploded elevational view according to the invention.
Figure 2:
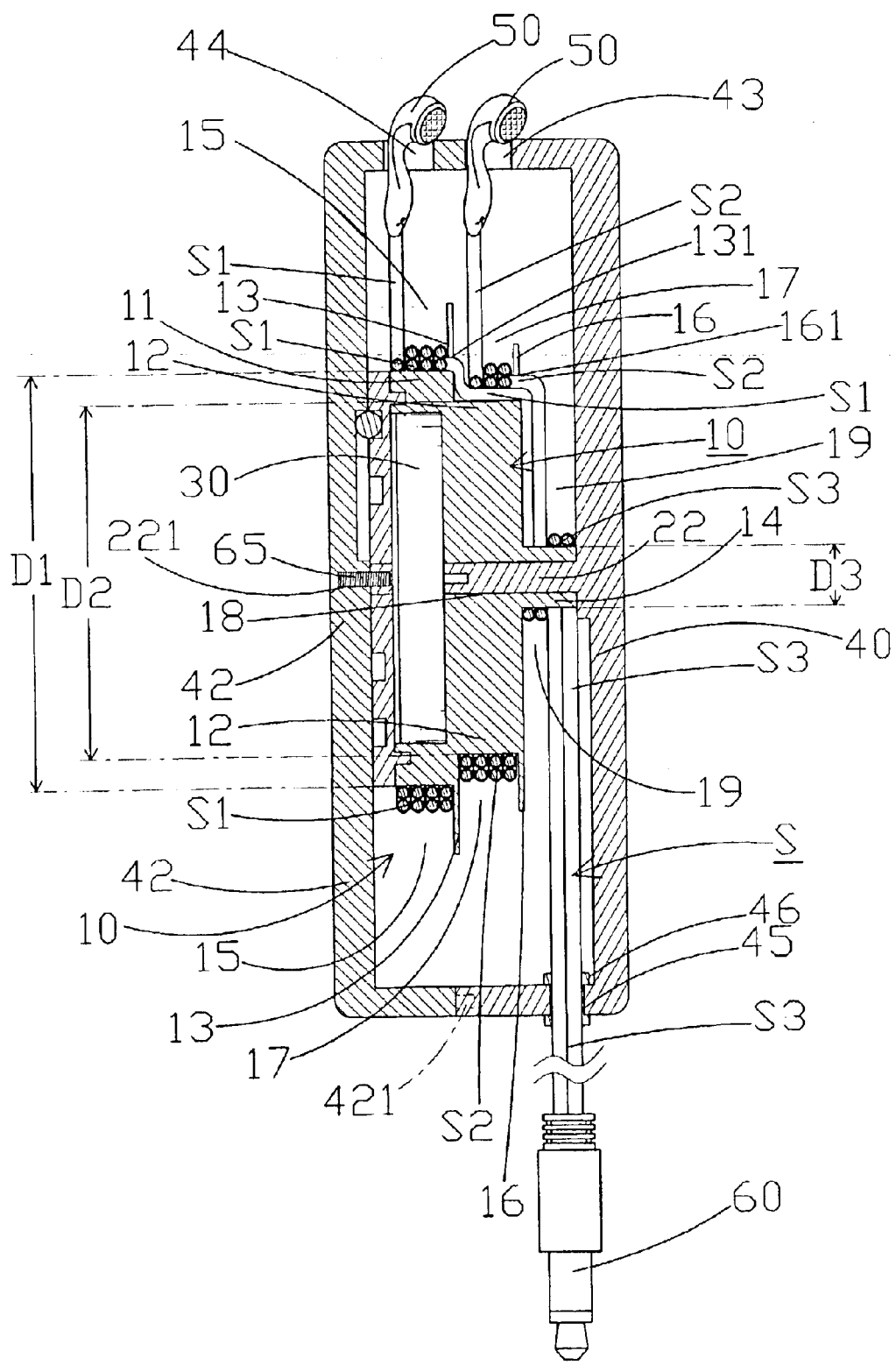
FIG. 2 shows a sectional view according to the invention.

Referring to FIGS. 1 and 2, the device in accordance with the invention is characterized by:

a main turning wheel 10 disposed with at least three A, B and C turning wheels 11, 12 and 14 having a same center orifice 18 flexibly connected to an axis 22;

A, B and C storage grooves 15, 17 and 19 formed on the wheel planes of the A, B and C turning wheels 11, 12 and 14;

at least two wires S winded and stored in the A, B and C storage grooves 15, 17 and 19;

upper, middle and lower wires S1, S2 and S3 from wires S stored in different storage grooves; and a spring 30 with a bottom end 31 thereof connected to the axis 22 and an outer end 32 thereof connected to a dented wheel plane 111 of the A turning wheel 11.

According to the aforesaid primary characteristics, wherein one end of the axis 22 is connected to the inner wall of a right housing 40 and the other end connected into an engagement opening 423 of a left housing 42; at the upper and lower edges of the left and right housing 40 and 42 are provided with bolts 401 and 421 and openings 402 and 422, respectively, so that the bolts 401 and 421 are inserted into the openings 402 and 422 to combine the left and right housings 40 and 42 into one body; and at the upper and lower portions of the left and right housings 40 and 42 are disposed with a plurality of wire guiding orifices 43, 44 and 45 for guiding the upper, middle and lower wires S1, S2 and S3 to the exterior.

According to the aforesaid primary characteristics, wherein between the A, B and C storage grooves 15, 17 and 19 are disposed with A and B partition pieces 13 and 16 provided with A and B wedging slots 131 and 161, respectively; at an appropriate position between the upper and middle wires S1 and S2 are placed with the B wedging slot 161 of the B partition piece 151 an appropriate segment of the upper wire S1 is placed into the wedging slot 131 of the A partition piece 13, and one end of the upper and middle wires S1 and S2 is penetrated through the upper wire guiding orifices 43 and 44 to the exterior, respectively; and the lower wire S3 is formed by merging the upper and middle wires S1 and S2, a lower end of the lower wire S1 is penetrated through the wire guiding orifice 45 to the exterior, and an anti-slide sheath 46 is accommodated into the wire guiding orifice 45 to stabilize the lower wire S3 for forming an immovable end.

According to the aforesaid primary or other characteristics, wherein a screw bolt 65 is penetrated into the engagement opening 423 to further insert and connect to a screw opening 221 located at the front portion of the axis 22 (as shown in FIG. 2).

Figure 4:
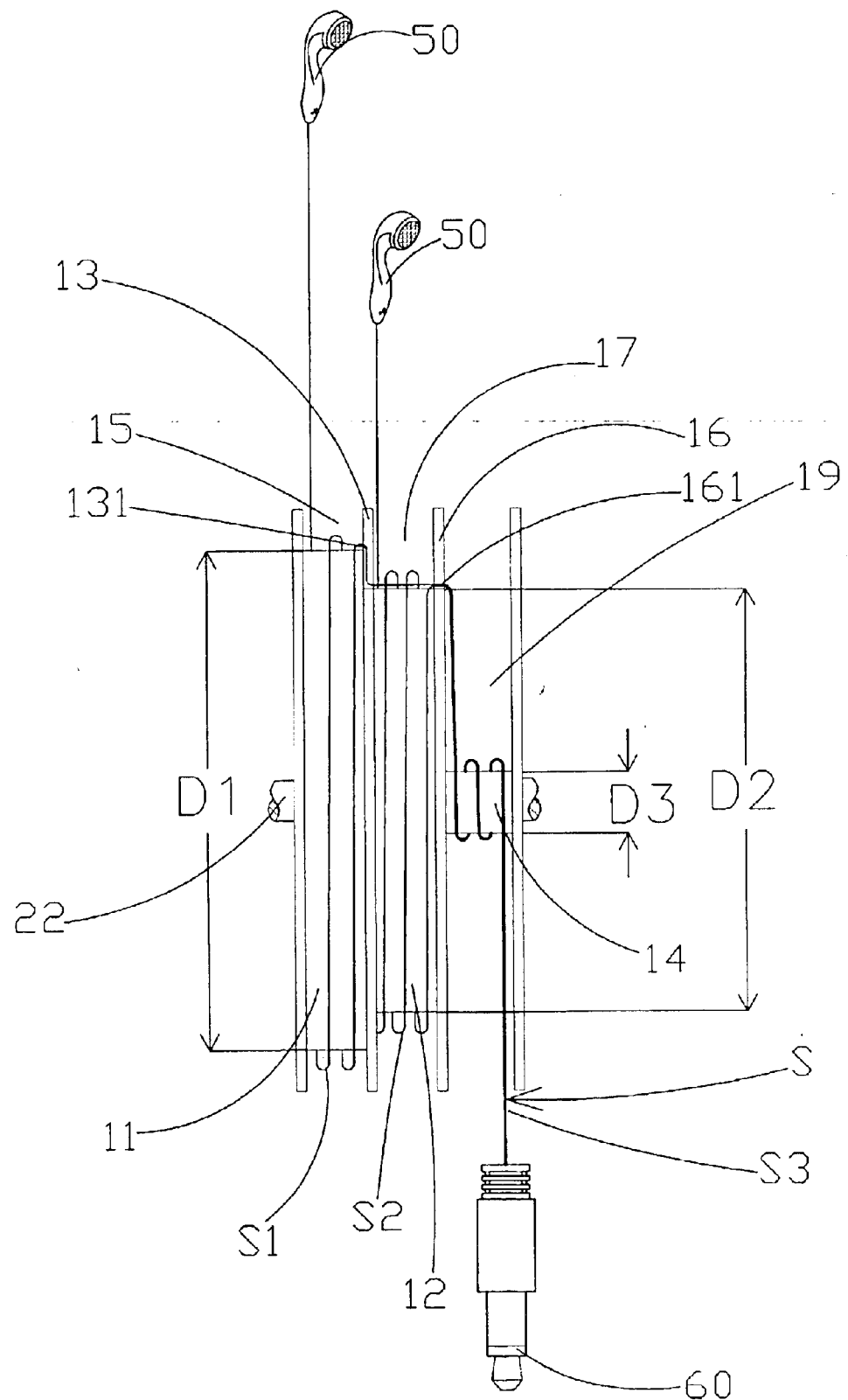
FIG. 4 shows a side schematic view illustrating the wire being displaced in the wire storage grooves having different diameters according to the invention.
Figure 9:
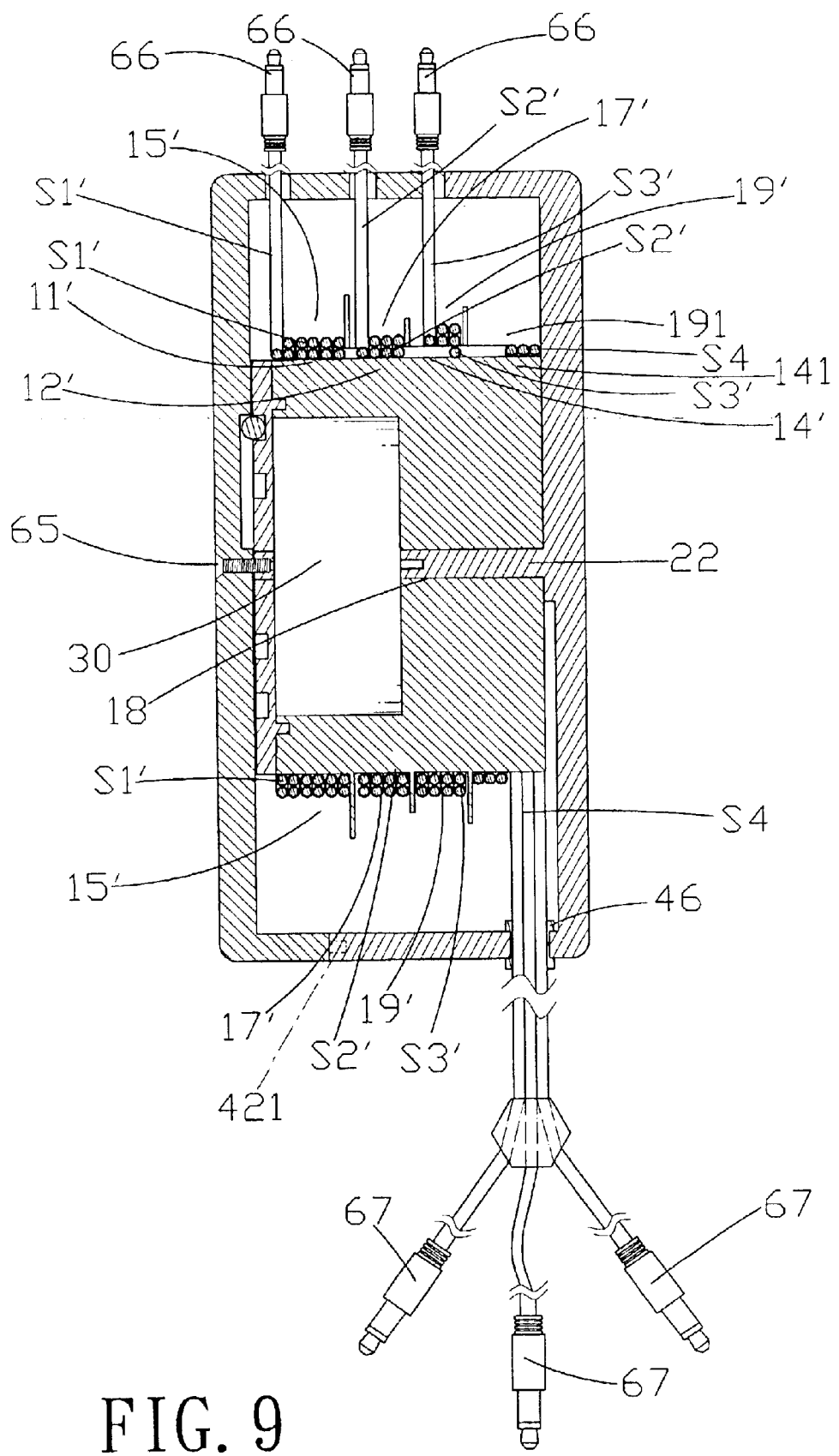
FIG. 9 shows a sectional schematic view illustrating the A, B, C and D turning wheels of the main turning wheel having same diameters according to the invention.

According to the aforesaid primary characteristics, wherein the diameters D1, D2 and D3 of the A, B and C turning wheels 11, 12 and 14 are different or the same (as shown in FIGS. 4 and 9).

Figure 8:
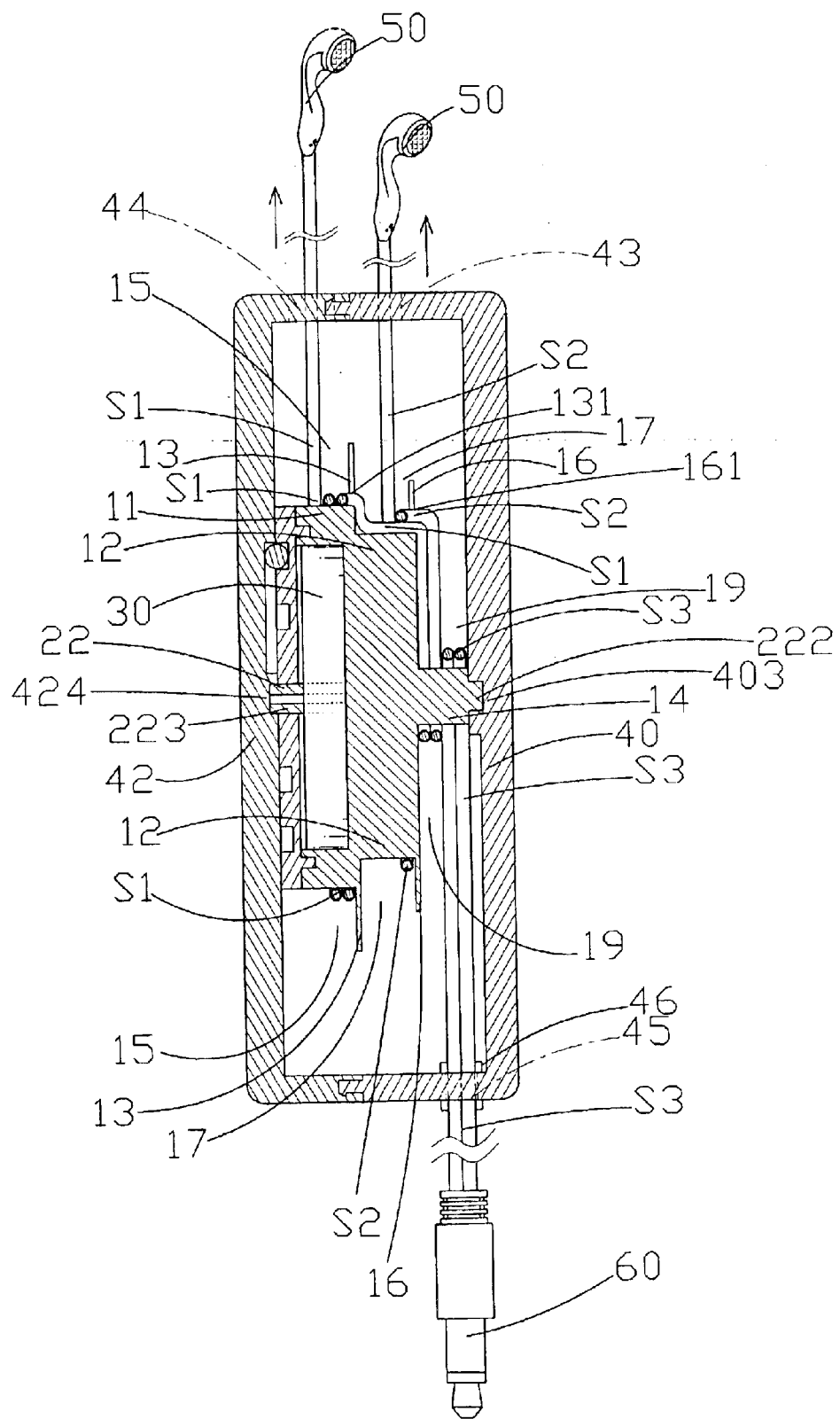
FIG. 8 shows a sectional view illustrating the main turning wheel being connected to the axis in another embodiment according to the invention.

According to the aforesaid primary and secondary characteristics, wherein the axis 22 is a formed integral with the main turning wheel 10, so as to flexibly connect the two axis ends 222 and 223 of the axis 22 into round notches 403 and 424 provided in advance at the inner walls of the left and right housing 40 and 42 (as shown in FIG. 8).

1. Referring to FIG. 2 and FIG. 4 showing a longitudinal sectional view according to the invention, wherein the A, B and C turning wheels 11, 12 and 14 are a combined body and are connected to the axis 22 through the same center orifice 18. When the A turning wheel 11 rotates one revolution, the length of the upper wire S1 being released (or winded) from the A storage groove 15 is π×D1, where D1 is the diameter of the A turning wheel 11. Similarly, each time the B and C turning wheels rotate one revolution, the lengths of the middle and lower wires S2 and S3 being released (or winded) from the B and C storage grooves 17 and 19 are π×D2 and π×D3, respectively, wherein D2 and D3 are diameters of the B and C turning wheels 12 and 14, respectively. As a result, when the A, B and C turning wheels 11, 12 and 14 rotate coaxially, the ratio of the wires winded (or released) by the three members equals to the ratio of the diameters of the A, B and C turning wheels 11, 12 and 14; that is, D1:D2:D3. To be more specific, the length of the upper wire S1 released (or winded) when the A turning wheel rotates one revolution is "longer" than that of the middle wire S2 when the B turning wheel rotates one revolution. The diameter C3 of the C turning wheel 14 is designed to be relatively smaller, and hence the length of the lower wire S3 released (or winded) is the shortest when the C turning wheel 14 rotates one revolution.

Figure 3:
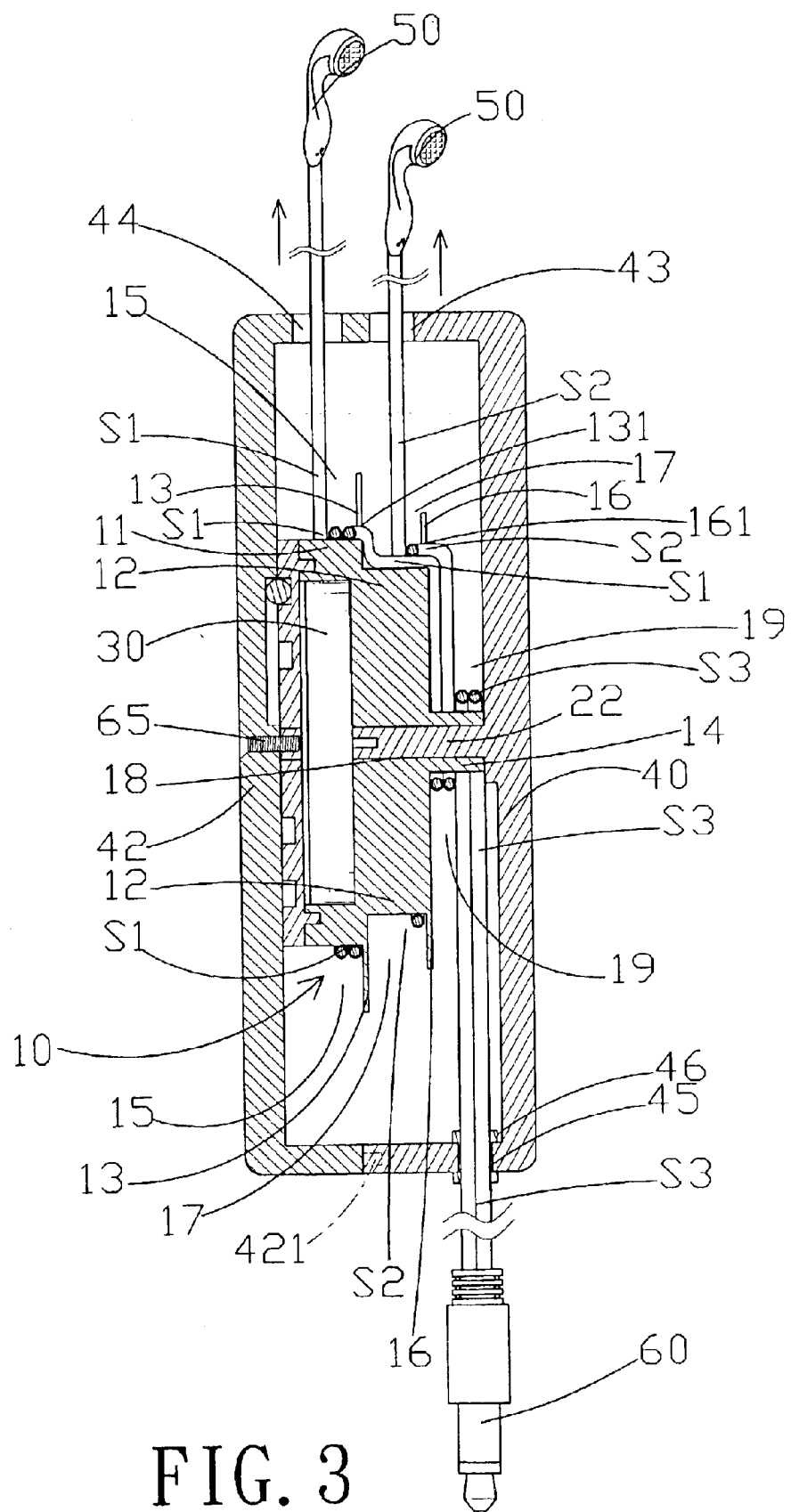
FIG. 3 shows a sectional view illustrating the action of a wire being extended according to the invention.
Figure 5:
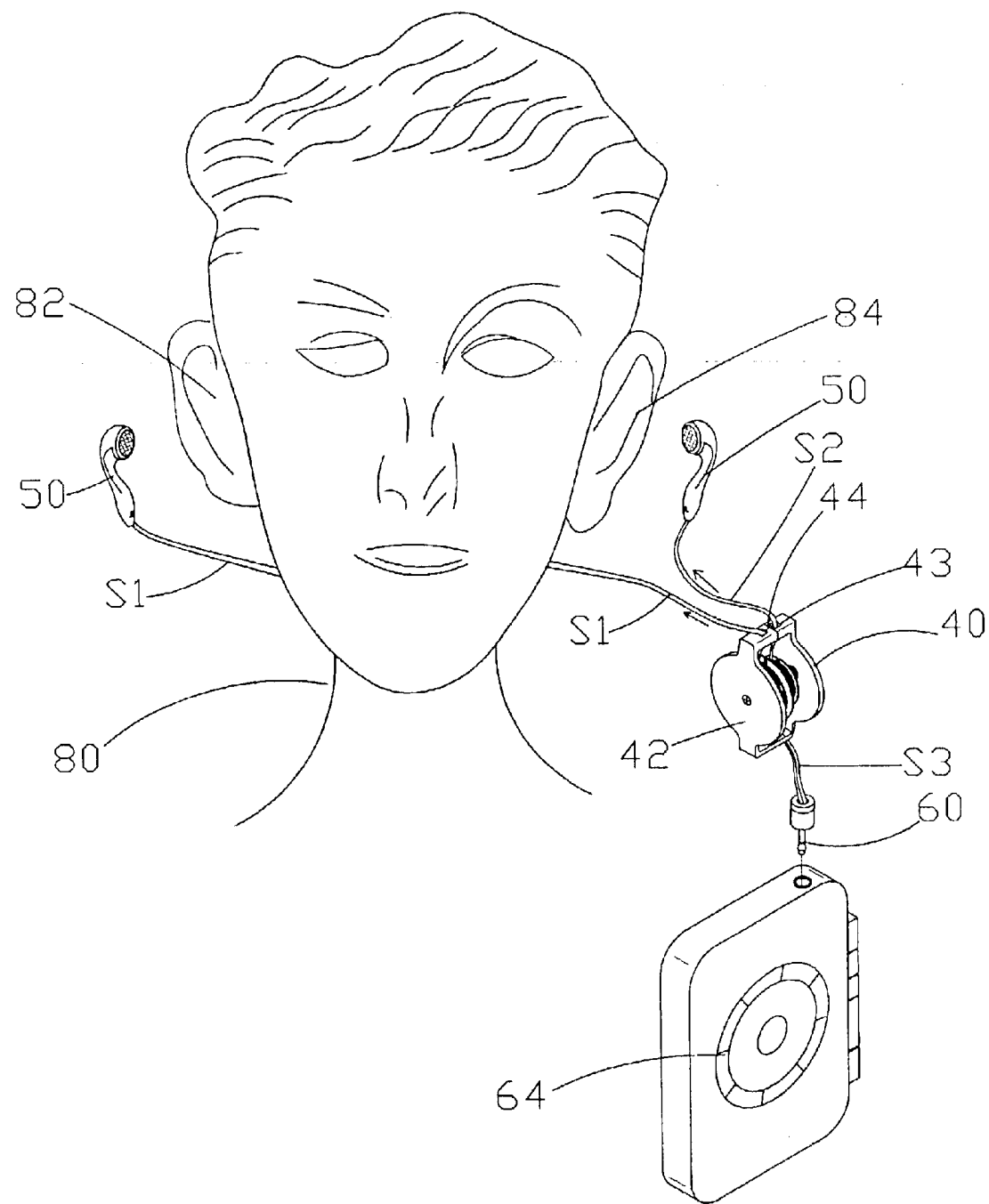
FIG. 5 shows an elevational view of the invention being implemented to an earphone.

2. Referring to FIG. 3, when two earphones 50 (or other terminal connectors) are simultaneously pulled, the main turning wheel 10 rotates regarding the axis 22 as the center of rotation thereof, and a spring 30 shows elastic contractions due to the tensile force produced therefrom. As described, because of the different diameters of the A, B and C turning wheels 11, 12 and 14, the length of the upper wire S1 released from the A storage groove 15 is the longest, the length of the middle wire S2 released from the B storage groove 17 is relatively shorter, and the length of the lower wire S3 simultaneously released is the shortest. Suppose the length of the upper wire S1 released is 50 cm, the length of the middle wire S2 released is 40 cm and the length of the lower wire S3 released is merely 5 cm, the upper wire S1 having the longest length released is able to go around a rear neck 80 of a user to further place the earphone into a left ear 82 as shown in FIG. 5. The length of the middle wire S2 is relatively shorter than that of the upper wire S1 for that it is not necessary to go around of rear neck 80 of the user. The other earphone 50 is then placed into a left ear 84 after the middle wire S2 is pulled out. The lower wire S3 is a combination of the upper and middle wires S2 and is stored in the C storage groove 19. The diameter of the C turning wheel 14 is rather small, and therefore when the upper and middle wires S1 and S2 are pulled, the lower wire S3 releases at a very short length from the C storage groove 19. At this point, an immovable end is formed due to the tightening of the anti-slide sheath 46 around an appropriate position of the lower wire S3, and thus the released lower wire S3 shows a lax state in the C storage groove 19 as indicated in FIG. 3, and the purpose thereof is to prevent a terminal plug 60 from sliding up and down. The wire winding device according to the invention may then be placed next to the waist portion of the user for connecting the terminal plug 60 to cellular phones or other electric appliances 64 such as CD or radio players.

3. Winding process of the upper, middle and lower wires S1, S2 and S3: when the two earphones 50 (50) are not in use and the positioning force thereof is dismissed, the contraction force of the spring 30 impels and rotates the main turning wheel 10 in a reverse direction regarding the axis 22 as the center of rotation, and thus winding the upper, middle and lower wires S1, S2 and S3 back into the A, B and C of the storage grooves 15, 17 and 19, respectively, and further positioning the earphones 50 (or terminal connectors) at the outer end of the wire guiding orifices 43 and 44; and the originally lax lower wire S3 is tightened again in the C storage groove 19 owing to reverse rotations of the C turning wheel 14. The lower portion of the lower wire S3 is positioned at the anti-slide sheath at the moment and therefore the terminal plug 60 becomes immovable.

Figure 6:
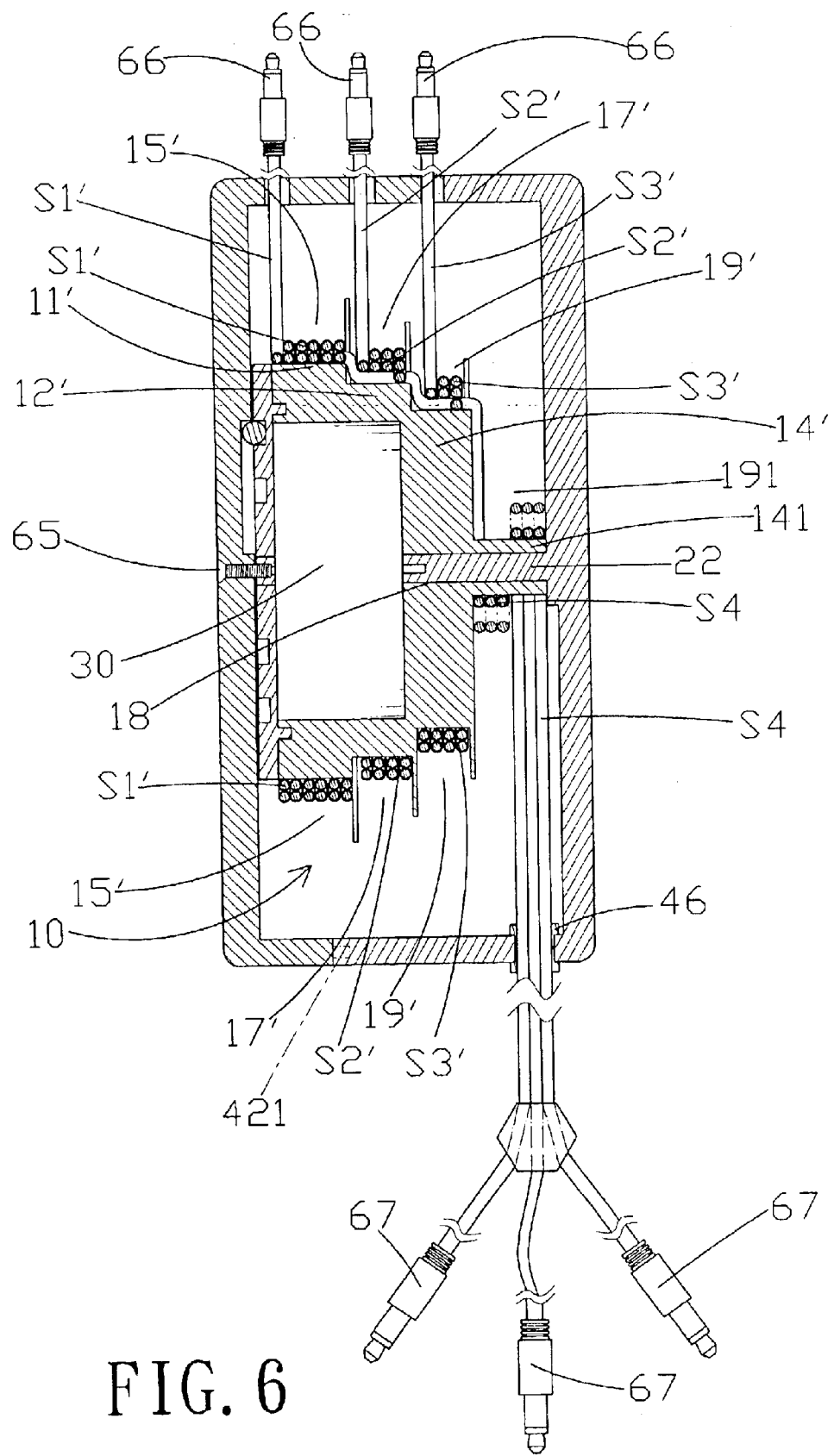
FIG. 6 shows a sectional view of another embodiment according to the invention.
Figure 7:
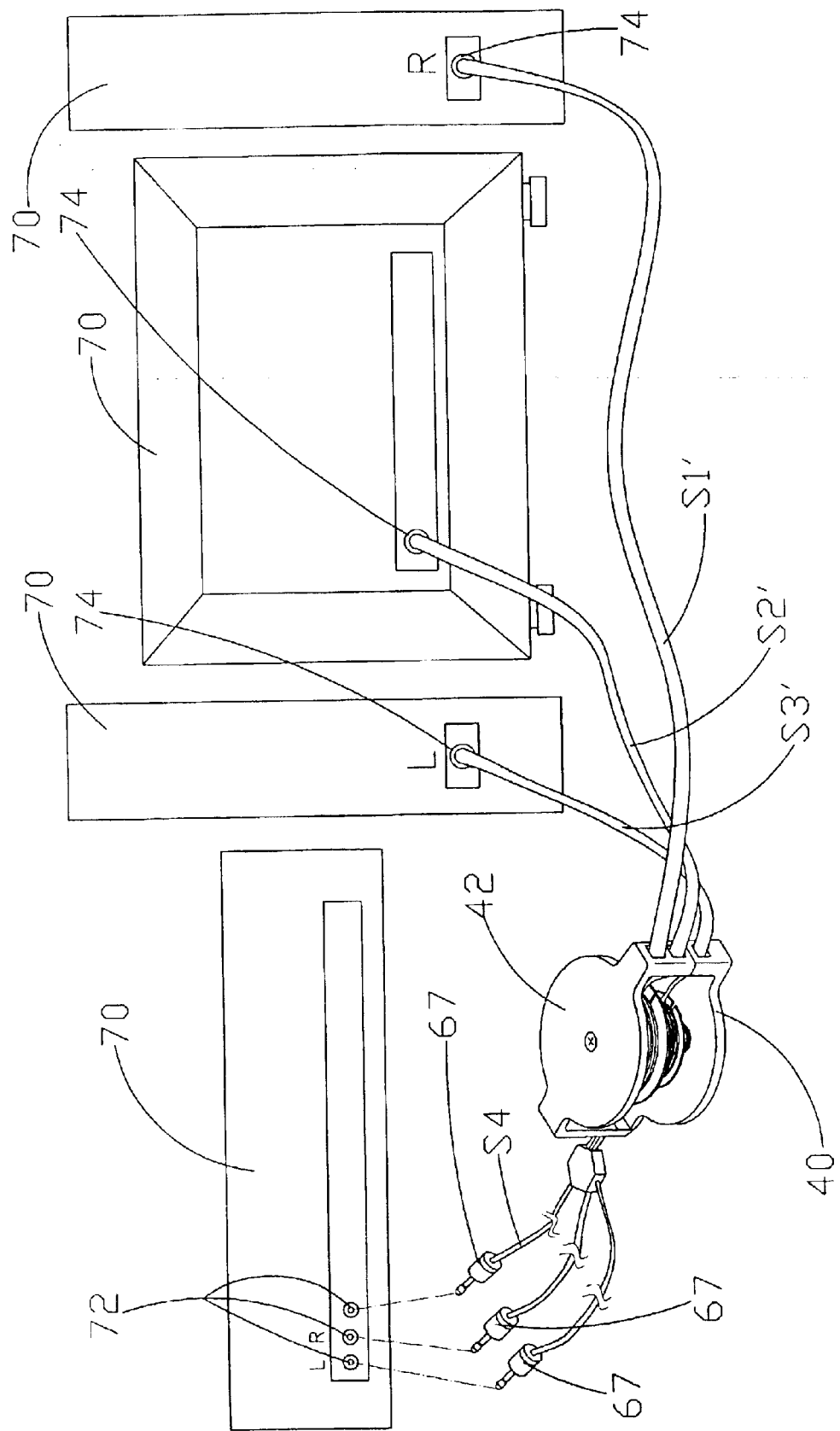
FIG. 7 shows a planar view illustrating a plurality of wire plugs being connected to electric appliances in an embodiment according to the invention.

4. Referring to FIG. 6 showing another embodiment according to the invention, the main turning wheel 10 of the invention is designed as four A, B, C and D turning wheels 11', 12', 14' and 141 having different diameters, and four A, B, C and D storage grooves 15', 17', 19' and 101 are formed for storing A, B, C and D wires S1', S2', S3' and S4, respectively, wherein the D wire S4 is formed by combining the A, B and C wires S1', S2' and S3'; that is, the D wire S3 is a merged wire of the three, and is split for placing into the A, B and C storage grooves 15', 17' and 19'. Two ends of the A, B, C and D wires S1', S2', S3' and S4 are connected with terminal connectors 66 and 67, respectively. Referring to FIG. 7, a plurality of electric appliances 70 are located with various distances in between, and the plurality of terminal connectors 67 of the D wire S4 are inserted into plugs 72 of the electric appliances. When the A, B and C wires S1', S2' and S3' are pulled, for that the A, B, C and D turning wheels 11', 12', 14' and 141 have different diameters, the released length of the A wire S1' is the longest, the released Length of the B wire S2' is shorter than that of the A wire S1', the released length of the C wire S3' is shorter than that of the B wire S2', and the D wire S4 shows a lax state in the D storage groove 191. In addition, the terminal connectors 67 become immovable due to the tightening effect of the anti-slide sheath 46, hence the plurality of terminal connectors 66 may be inserted into conductive sockets 74 of the electric appliances 70 located at different positions without making a mess out of the wires. More particularly, the wirs S may be winded at a fast speed when not in use.

5. Referring to FIG. 8, the axis 22 and the main turning wheel 22 are a formed integral so that the two axis ends 222 and 223 are flexibly connected into the round notches 403 and 424 provided in advance at the inner walls of the left and right housings 40 and 42, respectively, thereby freely rotating the axis in the round notches 403 and 424.

Referring to FIG. 9, the A, B, C and D turning wheels 11', 12', 14' and 141 have same diameters, and the A, B, C and D storage grooves 15', 17', 19' and 191 are for storing the A, B, C and D wires S1', S2', S3' and S4. According to this embodiment, the released lengths of the A, B, C and D wires S1', S2', S3' and S4 are the same to satisfy the requirements of the user. This embodiment shall be included in the claims appended.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A wire winding device having coaxial and multiple wheels comprising:
   a main wheel formed with at least three turning wheels having the same center orifice and different diameters connected to an axis;
   at least three storage grooves formed on the wheel planes of the turning wheel;

upper, middle and lower wires wound and stored in different ones of said at least three storage groove respectively; and a spring with a bottom end thereof connected to the axis and an outer end thereof connected to a dented wheel surface of the main wheel;

wherein one end of the axis is connected to the inner wall of a right housing and the other end connected into an engagement opening of a left housing; upper and lower edges of the left and right housing having bolts and openings respectively, such that the bolts are inserted into the openings to combine the left and right housings into one body; and at the upper and lower edges of the left and right housings having a plurality of wire guiding orifices for guiding the upper, middle and lower wires to the exterior.

2. A wire winding device having coaxial and multiple wheels in accordance with claim 1, wherein between said at least storage grooves are disposed, partition pieces provided with wedging slots, such that the upper and middle wires are placed within one of the wedging slots of the partition pieces, a segment of the upper wire is placed into one of the partition pieces, and one end of the upper and middle wires is penetrated. through wire guiding orifices to the exterior thereof, and the lower wire is formed by merging the upper and middle wires, a lower end of the lower wire is penetrated through wire guiding orifice to the exterior thereof, and an anti-slide sheath is accommodated into the wire guiding orifice to stabilize the lower wire for forming an immovable end.

3. A wire winding device having coaxial and multiple wheels in accordance with claim 1, wherein a screw bolt is penetrated into the engagement opening to further insert and connect to a screw opening located at the front portion of the axis.

* * * * *